UNITED STATES PATENT OFFICE.

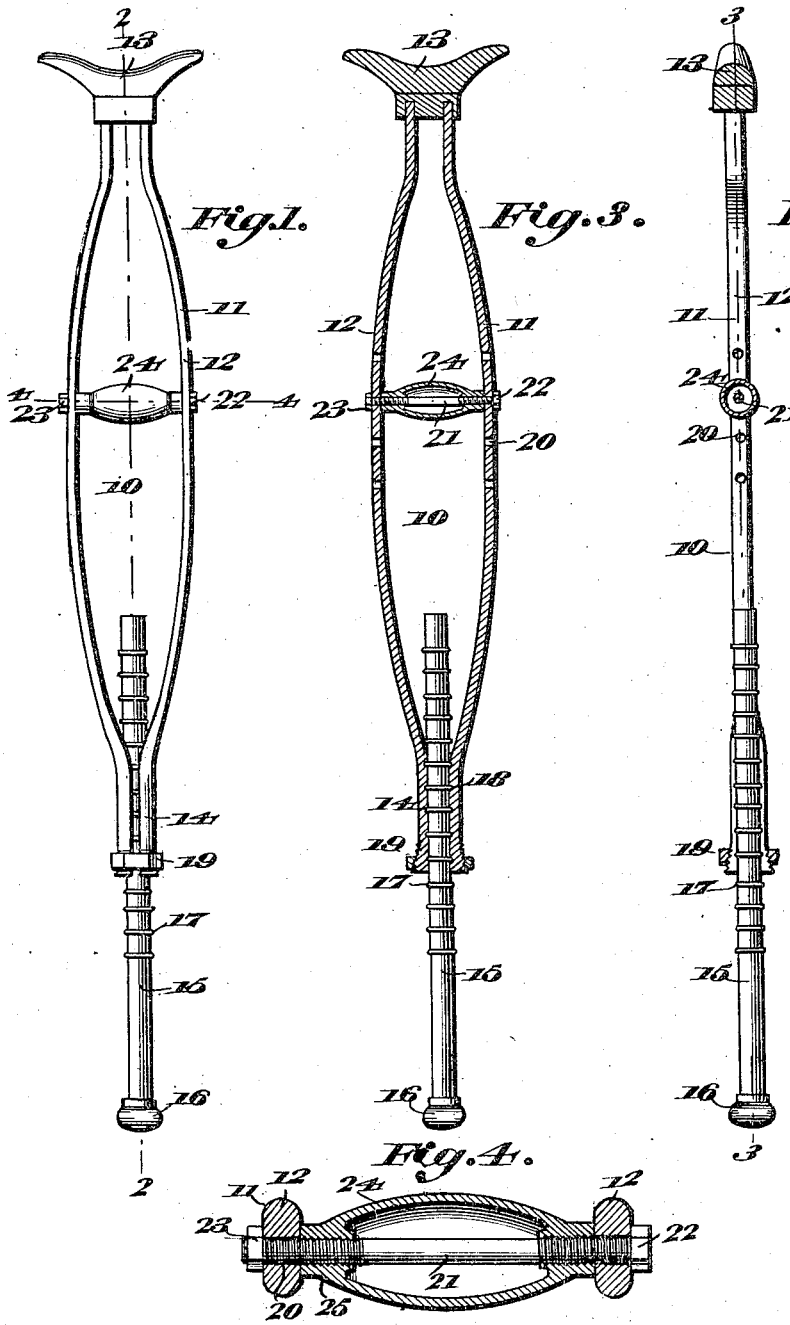

JACOB BAUERLE, OF WITT, ILLINOIS.

CRUTCH.

1,077,216.

Specification of Letters Patent. Patented Oct. 28, 1913.

Application filed June 10, 1913. Serial No. 772,347.

*To all whom it may concern:*

Be it known that I, JACOB BAUERLE, a citizen of the United States, residing at Witt, in the county of Montgomery and State of Illinois, have invented new and useful Improvements in Crutches, of which the following is a specification.

The invention relates to crutches for use by invalids, and has for an object to provide a crutch of a simple and durable construction and which can be readily adjusted in order that it may be used by short as well as tall people.

The invention embodies, among other features, a crutch which includes a frame having an adjustable stem and which is further provided with an adjustable handle whereby the stem may be adjusted relatively to the frame as well as the handle so that the crutch can be used by children as well as grown people, the crutch being so constructed that the adjustability thereof will not weaken the frame but provide a normally rigid structure.

In the further disclosure of the invention reference is to be had to the accompanying drawings, constituting a part of this specification, in which similar characters of reference denote corresponding parts in all the views, and in which:

Figure 1 is an elevation of the crutch; Fig. 2 is a vertical sectional view taken on the line 2—2 in Fig. 1; Fig. 3 is a vertical transverse sectional view taken on the line 3—3 in Fig. 2; and Fig. 4 is a horizontal sectional view taken on the line 4—4 in Fig. 1.

Referring more particularly to the views, I disclose a crutch 10 consisting of a frame 11 including side bars 12 terminating at their upper ends in a pad 13 of the usual type. The lower ends of the side bars are substantially semi-circular in cross section to provide a substantially tubular portion 14, the said tubular portion, however, being of a spring-like nature so that the lower ends of the side bars at the tubular portion will normally be spaced apart. A stem 15 including a preferably rubber cushion 16 is adapted to extend between the side bars of the tubular portion 14 and is provided with a series of horizontally arranged ribs 17 relatively spaced apart and adapted to be received in grooves 18 formed in the inner face of the side bars at the tubular portion 14. A nut 19 has threaded connection with the tubular portion 14, the outer faces of the side bars at the tubular portion being threaded to properly receive a nut thereon. It will now be readily apparent that when the nut is screwed downwardly on the tubular portion the lower ends of the side bars will be pressed together and into clamping engagement with the stem 15 to rigidly secure the stem relatively to the frame 11. By simply screwing upwardly on the nut 19 in order to permit the lower ends of the side bars to move apart by their spring-like action the side bars will be disengaged sufficiently from the stem to permit of adjusting the same relatively to the frame so that the length of the same from the lower end of the frame to the cushion 16 can be increased or decreased.

A series of apertures 20 are provided in the side bars 12 at substantially the medial portions thereof, and a bolt 21 provided with a head 22 is adapted to be passed through the horizontally registering apertures 20 of the side bars 12 as shown, the free end of the bolt being adapted to project beyond one of the side bars and received in a nut 23. The bolt 21 is threaded, and a grip 24, including threaded collars 25, is adapted to be arranged between the side bars 12 at substantially the medial portions thereof, after which the bolt 21 is arranged to pass through the apertures in the side bars and have threaded connection with the collars 25 and pass therethrough so that when the nut 23 is applied to the free end of the bolt, the collars of the grip will be engaged by the inner faces of the side bars to rigidly secure the grip between the same. By simply removing the nut 23 it will be readily apparent that the grip can be unscrewed from the bolt and the bolt removed from the side bars, after which the bolt can be passed through other registering apertures and through the grip in order that the grip can be adjusted vertically on the side bars or frame formed by the side bars.

From the foregoing description it will be apparent that with the crutch described a structure is provided which can be used by short people as well as tall people and which can be adjusted so that the same can be used by children as well as by grown people, it being possible with my crutch to not only adjust the grip with respect to the frame but also to adjust the stem with respect to the frame.

It will be understood that the crutch can be made of any convenient material and can also be made of metal if desirable.

Having thus described my invention, I claim:

In a crutch, the combination with a frame consisting of side bars, of a pad having the upper ends of the side bars connected thereto, the lower ends of the side bars being semi-circular in cross section to provide a tubular portion, a nut having threaded connection with the tubular portion and when screwed down thereon adapted to move the lower ends of the side bars together, a stem passing through the tubular portion and adapted to be clampingly engaged by the lower ends of the side bars when the nut is screwed down on the tubular portion, and horizontal ribs formed on the said stem and adapted to be received in grooves in the inner faces of the tubular portion to secure the stem rigidly relatively to the said frame.

In testimony whereof I affix my signature in presence of two witnesses.

JACOB BAUERLE.

Witnesses:
H. F. HOEHN,
R. M. SHORT.

Copies of this patent may be obtained for five cents each, by addressing the "Commissioner of Patents, Washington, D. C."